Patented Oct. 19, 1948

2,451,549

UNITED STATES PATENT OFFICE 2,451,549

PRODUCTION OF METAL SULFONATES

Felix C. Gzemski, Philadelphia, Pa., assignor to The Atlantic Refining Company, Philadelphia, Pa., a corporation of Pennsylvania No Drawing. Application August 30, 1945, Serial No. 613,697

4 Claims. (Cl. 260—448)

The present invention relates to the production of metal salts of oil-soluble sulfonic acids, and particularly the aluminum salts of oil-soluble petroleum sulfonic acids. The metal sulfonates are especially adapted for use as agents for improving the adhesivity of bitumens or asphalt for mineral aggregates, and as detergent agents for internal combustion engine lubricating oils.

In accordance with the present invention, an oil-soluble sulfonic acid is reacted with a cyclic nitrogen base and the resulting sulfonate is heated in admixture with a basic compound of a metal at such temperature and for a sufficient period of time to drive off the cyclic nitrogen base and replace same with the metal, thus producing the desired metal sulfonate.

The cyclic nitrogen base sulfonates employed in the first step of my process are prepared by reacting oil-soluble sulfonic acids with a cyclic nitrogen base in an amount sufficient to at least partially neutralize the sulfonic acids, and preferably to completely neutralize the acids. The oil-soluble sulfonic acids may be derived from petroleum oils, heavy coal tar distillates, fats, fatty oils, and the like by subjecting the raw material to treatment with a sulfonating agent such as concentrated sulfuric acid, fuming sulfuric acid, chlorsulfonic acid, or sulfur trioxide for a period of time sufficient to effect sulfonation, and thereafter separating insoluble sludge from the oil containing the sulfonic acids. The oil solution of sulfonic acids is then neutralized with the cyclic nitrogen base to form a relatively insoluble cyclic nitrogen base sulfonate which may be separated from the oil by decantation or centrifuging. The cyclic nitrogen bases which may be employed are exemplified by pyridine, the alkyl-substituted pyridines such as the methyl and ethyl pyridines (lutidines), quinoline, the alkyl-substituted quinolines (quinaldines), isoquinoline, piperidine, pyridazine, pyrazole, pyrazine, pyrrole, or mixtures of two or more thereof. In preparing the cyclic nitrogen base sulfonate, there is added to the oil containing the sulfonic acids, an amount of nitrogen base calculated to give 90 per cent to 100 per cent neutralization of the sulfonic acids, and the mixture is thoroughly agitated for a period of time sufficient to effect neutralization. This operation may be carried out at ordinary temperature, but in order to render the separation of the nitrogen base sulfonate from the oil more rapid, the temperature of the mixture is preferably increased to 180° F. to 220° F., a temperature of about 200° F. being quite satisfactory. The temperature is maintained within this range until the sulfonate begins to precipitate and settle, and the temperature is then reduced to 140° F. to 160° F. and the oil is decanted from the sulfonate at this temperature. If desired, the sulfonate may be centrifugally separated from the oil, provided the temperature is maintained sufficiently high to prevent solidification of the sulfonate. At temperatures between 140° F. and 220° F. the sulfonate, which normally occludes some oil, is a viscous material which will flow at such temperature, but at ordinary temperatures (70° F.) the sulfonate is solid. While it is preferred to effect separation of the sulfonate from the oil at elevated temperatures, it is of course possible to accomplish such result at ordinary temperatures, provided a sufficiently long settling period is employed. In the case of sulfonates prepared from relatively heavy oils or high boiling naphthenic oils, the precipitation of the sulfonates and the settling thereof from the oil may be facilitated by the addition of a small amount of water, for example, 1 per cent to 3 per cent by volume of the oil. If it is desired to prepare a sulfonate substantially free of oil or containing a controlled amount of oil, the crude sulfonate may be deoiled by treatment with a paraffinic hydrocarbon solvent, such as straight-run low boiling naphtha, pentane, butane, liquid propane, or mixtures thereof, in which the oil is soluble and the sulfonate relatively insoluble.

The cyclic nitrogen base sulfonate, as prepared above, is then converted to a metal sulfonate by adding a basic compound of a metal, such as the oxide, hydroxide, or carbonate, and the mixture is heated at a temperature sufficiently elevated to cause reaction, with the liberation and driving off of the cyclic nitrogen base and its replacement by the metal. This is accomplished at temperatures between 250° F. and 500° F., and preferably between 300° F. and 400° F. The reaction temperature and duration of heating is dependent upon the nature of the cyclic nitrogen base, its boiling point, and the pressure employed. At atmospheric pressure, a temperature between 300° F. and 400° F. has been found satisfactory in converting pyridine and quinoline sulfonates into metal sulfonates. With a reduction in pressure, the temperature may be lowered. Alternatively, the reaction may be carried out in the presence of an inert gas, the sweeping action of which assists in the removal of the cyclic nitrogen base.

The metal bases which may be employed in accordance with this invention are exemplified by the oxides, hydroxides and carbonates of copper, cobalt, nickel, lead, tin, zinc, calcium, strontium, barium, and aluminum. The quantity of metal base employed should be sufficient to neutralize the sulfonic acid liberated from the cyclic nitrogen base sulfonate, and where it is desired to produce a basic sulfonate of the metal, a substantial excess of metal base is utilized. In a preferred mode of operation, freshly precipitated metal hydroxide is employed, since reaction is more rapid and complete than when the dry oxide, hydroxide, or carbonate is used. The reaction in many cases, may be facilitated by the addition of a small amount of water, for example, up to 10 per cent by weight of the reactants.

The present invention may be further illustrated by the following examples, which, however, are not to be construed as limiting the scope thereof.

1. A selective solvent extract fraction of a petroleum lubricating oil stock having a Saybolt universal viscosity of 524 seconds at 100° F. and an A. P. I. gravity of 17.3° was treated with 5 successive dumps of 5 per cent by volume each of 98 per cent concentration sulfuric acid, the acid sludge being settled and separated between each dump. The resulting sour oil containing about 12 per cent of oil-soluble sulfonic acids was neutralized with a mixture of alkyl pyridines having a boiling range of 284° F. to 392° F. and a precipitate of viscous, dark colored pyridinium sulfonate was separated from the oil. This pyridinium sulfonate had a saponification number of 57.3.

100 parts by weight of the pyridinium sulfonate was admixed with 2.6 parts by weight of powdered aluminum hydroxide and the mixture was heated at 300° F. to 350° F. for 3 hours, a stream of air being passed over the reactants during the heating. As a result of the ensuing reaction the alkyl pyridines were driven off and replaced by the aluminum, and there was obtained a clear, sticky, semi-solid mass of aluminum tri-sulfonate which was soluble in benzene and extraction naphtha.

2. The procedure of Example 1 was repeated, with the exception that in the second step, 74 parts by weight of pyridinium sulfonate, 4 parts by weight of aluminum hydroxide, and 6 parts by weight of water were used. The resulting product appeared to be a sticky, semi-solid aluminum di-hydroxy sulfonate.

3. To 10 parts by weight of sour oil containing 12 per cent of oil-soluble sulfonic acids was added 1 part by weight of quinoline, and the mixture was thoroughly agitated at about 80° F. until the reaction was completed. The mixture was then settled and a dark colored precipitate of quinolinium sulfonate was separated from the oil.

The quinolinium sulfonate was then mixed with sufficient freshly precipitated aluminum hydroxide to neutralize the sulfonic compound, and the mixture was heated at 425° F. for 3 hours in a stream of air. As a result of the reaction, quinoline was driven off and replaced by the aluminum, and there was obtained a neutral aluminum sulfonate of the same character as that of Example 1.

To test the adhesivity-improving properties of the aluminum sulfonates as prepared above, road oils were made up comprising 34 per cent of furnace oil (medium), 61 per cent of 85/100 penetration asphalt, and 5 per cent of aluminum sulfonates. The road oils were added in increments to aggregate samples consisting of 100 grams of 20–60 mesh sand wetted with 50 grams of water, and it was found that despite the presence of the water, it required only 4.5 grams of each of the road oils for complete adhesion. These asphalt coated aggregates, when placed in boiling water for one minute, did not strip, the asphalt remaining firmly bonded to the sand.

The method of the present invention is primarily of advantage where it is desired to produce concentrates of metal sulfonates or metal sulfonates free from or containing controlled amounts of oil. By first treating the oil solution of sulfonic acids with a cyclic nitrogen base and precipitating the cyclic nitrogen base sulfonate, it is possible to obtain concentrates containing upwards of 50 per cent of sulfonates, which, in the second step of the process are readily and economically converted into metal sulfonates, with regeneration of the cyclic nitrogen base which may be recycled for further use in the process.

I claim:

1. The method of producing a metal salt of an oil-soluble sulfonic acid, which comprises neutralizing an oil containing said oil-soluble sulfonic acid with a heterocyclic nitrogen base at a temperature between 180° F. and 220° F., precipitating and separating the oil-insoluble nitrogen base sulfonate from the oil at a temperature between 140° F. and 160° F., and reacting the nitrogen base sulfonate with a basic compound of a metal at a temperature between 300° F. and 400° F. to replace the nitrogen base with the metal.

2. The method of producing a metal salt of an oil-soluble sulfonic acid, which comprises neutralizing an oil containing said oil-soluble sulfonic acid with pyridine at a temperature between 180° F. and 220° F., precipitating and separating the oil-insoluble pyridine sulfonate from the oil at a temperature between 140° F. and 160° F., and reacting the pyridine sulfonate with a basic compound of a metal at a temperature between 300° F. and 400° F. to replace the pyridine with the metal.

3. The method of producing a metal salt of an oil-soluble sulfonic acid, which comprises neutralizing an oil containing said oil-soluble sulfonic acid with quinoline at a temperature between 180° F. and 220° F., precipitating and separating the oil-insoluble quinoline sulfonate from the oil at a temperature between 140° F. and 160° F., and reacting the quinoline sulfonate with a basic compound of a metal at a temperature between 300° F. and 400° F. to replace the quinoline with the metal.

4. The method of producing an aluminum salt of an oil-soluble sulfonic acid, which comprises neutralizing an oil containing said oil-soluble sulfonic acid with a heterocyclic nitrogen base at a temperature between 180° F. and 220° F., precipitating and separating the oil-insoluble nitrogen base sulfonate from the oil at a temperature between 140° F. and 160° F., and reacting the nitrogen base sulfonate with aluminum hydroxide at a temperature between 300° F. and 400° F. to replace the nitrogen base with aluminum.

FELIX C. GZEMSKI.

REFERENCES CITED

The following references are of record in the file of this patent:

UNITED STATES PATENTS

| Number | Name | Date |
|---|---|---|
| 497,740 | Zeigler | May 16, 1893 |
| 709,321 | Helmers | Sept. 16, 1902 |
| 1,438,101 | Divine I | Dec. 5, 1922 |
| 1,495,891 | Divine II | May 27, 1924 |
| 1,889,383 | Schmidt | Nov. 29, 1932 |

(Other references on following page)

| Number | Name | Date |
|---|---|---|
| 1,937,521 | Limburg | Dec. 5, 1933 |
| 1,947,652 | Langedijk | Feb. 20, 1934 |
| 2,130,668 | Gunther | Sept. 20, 1938 |
| 2,133,787 | Northey | Oct. 18, 1938 |
| 2,155,961 | Trowell | Apr. 25, 1939 |
| 2,197,800 | Henke et al. | Apr. 23, 1940 |
| 2,243,332 | deSimo et al. | May 27, 1941 |
| 2,279,086 | Bergstrom | Apr. 7, 1942 |
| 2,304,230 | Archibald et al. | Dec. 8, 1942 |
| 2,307,953 | Potter | Jan. 12, 1943 |
| 2,316,670 | Colgate et al. | Apr. 13, 1943 |

FOREIGN PATENTS

| Number | Country | Date |
|---|---|---|
| 295,734 | Great Britain | Aug. 17, 1928 |
| 551,425 | Germany | June 2, 1932 |